Oct. 21, 1952  C. A. ELLIS ET AL  2,614,557
OPHTHALMIC INSTRUMENT
Filed Sept. 23, 1948  4 Sheets-Sheet 1

INVENTORS
CHARLES A. ELLIS
HENRY B. COLE
BY
Louis L. Gagnon
ATTORNEY

INVENTORS
CHARLES A. ELLIS
HENRY B. COLE
BY Louis L. Gagnon
ATTORNEY

Oct. 21, 1952 — C. A. ELLIS ET AL — 2,614,557
OPHTHALMIC INSTRUMENT
Filed Sept. 23, 1948 — 4 Sheets-Sheet 3

INVENTORS
CHARLES A. ELLIS
HENRY B. COLE
BY Louis L. Gagnon
ATTORNEY

Oct. 21, 1952  C. A. ELLIS ET AL  2,614,557
OPHTHALMIC INSTRUMENT
Filed Sept. 23, 1948  4 Sheets-Sheet 4

INVENTORS
CHARLES A. ELLIS
HENRY B. COLE
BY Louis L. Gagnon
ATTORNEY

Patented Oct. 21, 1952

2,614,557

UNITED STATES PATENT OFFICE 2,614,557

OPHTHALMIC INSTRUMENT

Charles A. Ellis, Southbridge, Mass., and Henry B. Cole, East Woodstock, Conn., assignors to American Optical Company, Southbridge, Mass., a voluntary association of Massachusetts Application September 23, 1948, Serial No. 50,764

11 Claims. (Cl. 128—76.5)

1

This invention relates to devices for testing and exercising the eyes and particularly to an improved stereoscopic device for use in the examination of the eyes and the correction of defects such as excessive phoria, ocular image differences, and departures from normal stereoscopic or tridimensional vision.

A principal object of the invention is to provide an improved instrument of the above character for examining and aiding in the correction of faulty visual perception, particularly as applied to binocular or stereoscopic vision.

Another important object is to provide an improved device of the above character for determining vertical and lateral phorias of a pair of eyes and aiding in the correction of the prismatic imbalance of the eyes jointly or independently of each other.

Another object is to provide a device of the above character in which the degree of convergence for a given accommodation range may be varied.

Another object is to provide an instrument of the above character designed for depth perception, the stereoscopic adjustments being made by the controlled adjustments of independent targets or charts in accordance with the readings of a scale or scales associated therewith.

Another object is to provide an improved device of the above character which presents a pair of half-stereograms to the eyes by means of which the correct optical positions in space for true stereopsis are obtained.

Another object is to provide an instrument of the above character which will provide normal accommodation-convergence relationship while being used or, if desired, provide abnormal accommodation-convergence patterns, the provision allowing emphasis to be placed upon either accommodation or convergence as desired in accordance with the particular test or training procedure involved.

Another object is to provide a device of the above character with means whereby the targets or charts may be individually and independently or simultaneously moved toward or away from one another at a specific distance from the viewing lenses with no change in the demand for accommodation to aid in fusion effort, each target or chart being provided with individual vertical adjustment means to compensate for vertical deviations in the patient's eyes.

Another object is to provide a device of the above nature which may be simply and quickly adjusted to position the eyes of the patient in proper alignment with the lenses.

Another object is to provide a device of the above character which may be easily operated by either the patient or the eye examiner.

Other objects and advantages of the invention

2 will become apparent from the following description taken in connection with the accompanying drawings, in which:

Instruments used for developing the eyes in the past have proven effective for revealing and correcting anomalies of near-point and far-point vision and give fairly accurate diagnosis of the stereo or tri-dimensional vision of a patient. However, it has been found that prior art instruments of this type are not versatile enough to contend with all conditions which may be found to exist with respect to a patient's vision since they do not embody means for making all the adjustments necessary to change the various angles defining the correct relative positions of the targets in terms of any specified amount of variance from normal whereby, if desired, proper adjustment of these angles can be made so as to maintain the appropriate conditions for best possible fusion. The present disclosure embodies means for making these additional adjustments and further improves upon the prior art by providing proper scales and arrangement of parts so that the patients themselves may easily and efficiently operate the instrument to exercise their eyes without the necessity of employing an expert for this purpose.

Referring to the drawings wherein like characters of reference designate like parts throughout the several views, the instrument embodying the invention comprises a heavy base 11 having an adjustable stand 12 pivotally connected thereto and adapted to be locked in adjusted position by manual operation of a knob 13. The base 11 is provided with spaced upwardly projecting lugs 14 and 15 between which is disposed the base portion of the stand 12, and stand 12 and lugs 14 and 15 being provided with concentric bores in which is located a spindle 16. The spindle 16 has a head portion 17 disposed on one end thereof of a size to reside within the bore in the lug 15 and has a bushing 18 disposed thereover adjacent the head portion 17, the bushing 18 and shaft 16 being held immovable by a taper pin 18 extending through them and into the lug 15 and held in place by a set screw 20.

Figure 9:
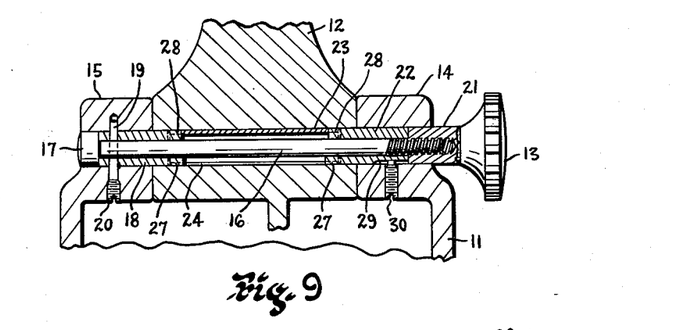
Fig. 9 is a fragmentary sectional view of the base clamping arrangement taken on line 9—9 of Fig. 2 and looking in the direction of the arrows.
Figure 10:
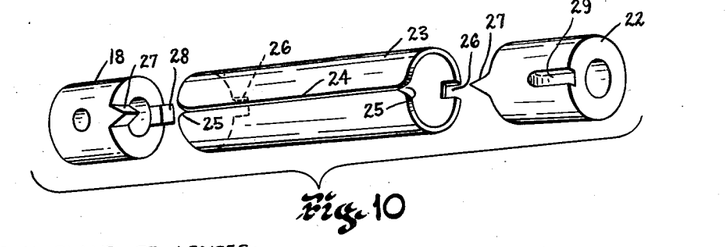
Fig. 10 is an exploded perspective view of the friction clamping members shown in Fig. 9.

The other end of the shaft 16 is threaded and engages a threaded opening in a hub portion 21 formed on the inner side of the knob 13, the hub portion 21 being of a size to rotatably reside in the bore in the adjacent lug 14. A second bushing 22 is mounted over the spindle 16 adjacent the hub portion 21, the spaced bushings 18 and 22 having a tubular member 23 disposed between their inner ends and within the bore in the stand 2. The member 23 is split longitudinally thereof as at 24, each end portion of the member communicating with the split being cut away to form substantially V-shaped notches 25 and having flat-bottomed notches 26 formed therein in substantial diametric opposition to the V-notches 25. The inner ends of the bushings 18 and 23 are provided with short beveled extensions 27 shaped in substantial conformity with the notches 25 and are adapted to reside therein when the device is assembled as shown in Fig. 9. The said ends of the bushings are also provided with key-like projections 28 adapted to engage the notches 26.

Figure 8:
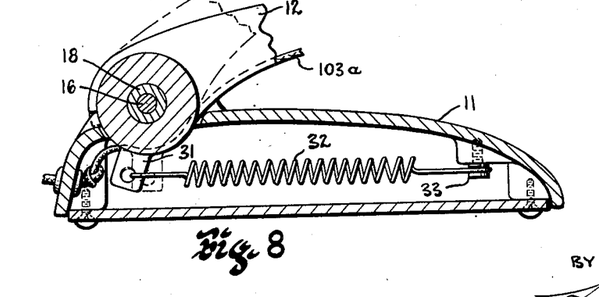
Fig. 8 is a fragmentary sectional view of the base and adjustable support taken on line 8—8 of Fig. 1 and looking in the direction of the arrows.

The bushing 22 is provided near one end with a groove 29 therein, which groove 29 is adapted to be engaged by a set screw 30 inserted through a portion of the lug 14 to prevent rotation of the bushing 22. The base portion of the stand 12 is provided with a short protuberance 31 (Fig. 8) which extends within the hollow base 11 and has one end of a tension spring 32 connected thereto, the other end of the spring 32 being secured to a portion of the base 11 as by the stud 33. Thus, substantially constant tension is placed upon the stand 12 to provide ease in adjusting it at the desired angle.

In operating the clamping device to position the stand 12 in desired position, the knob 13 is manually rotated to relieve pressure upon the bushing 22, member 23 and bushing 18. Then after positioning the stand 12 as desired the knob 13 will be tightened to exert pressure upon the bushing 22, member 23 and bushing 18. This will cause the extensions 27 and 28 on the bushings 18 and 22 to engage the notches 25 and 26 in the ends of the tubular member 23, the engagements between the extensions 28 and notches 26 preventing rotation of the clamp member 23. The engagements of the extensions 27 with the V-shaped notches 25 communicating with the split 24 act to spread the member 23 and cause the same to frictionally engage the walls of the bore in the stand 12 and by reason of the fact that the bushings 18 and 22, which carry the extensions 27, are keyed to the lugs 14 and 15 the said stand 12 will be locked in adjusted position.

Figure 1:
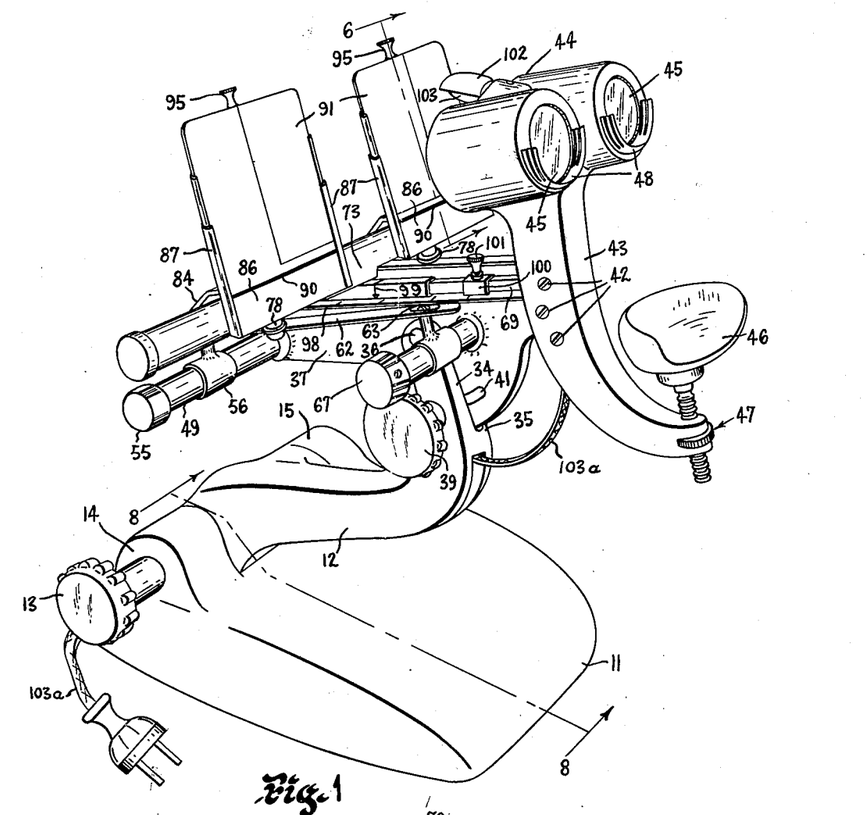
Fig. 1 is a perspective view of a stereo disparator embodying the present invention.
Figures 3, 6, 7:
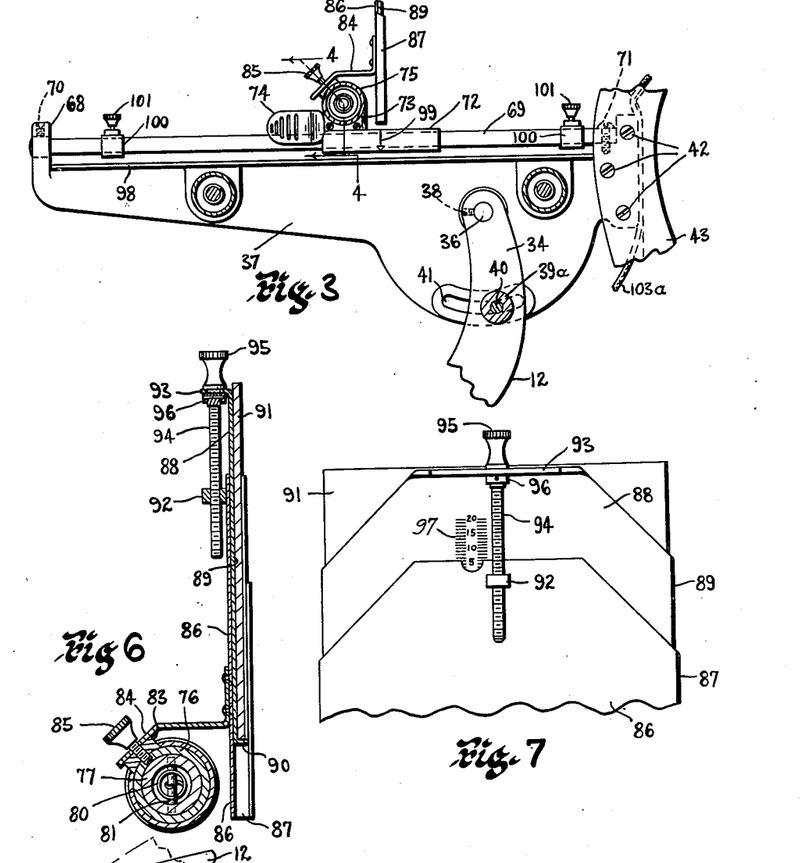
Fig. 3 is a fragmentary sectional view of the device taken on line 3—3 of Fig. 2 and looking in the direction of the arrows.
Fig. 6 is a sectional view through a chart holder and support taken on line 6—6 of Fig. 1 and looking in the direction of the arrows.
Fig. 7 is a fragmentary rear elevational view of a chart holder showing the vertical adjustment means therefor.

The stand 12, which may take the form of a gooseneck, is formed with a bifurcated upper end, the bifurcations 34 and 35 rotatably carrying a beam 37 therebetween on a shaft 36, which shaft is fixedly secured in the bifurcations as by set screws 38 (Fig. 3). The beam 37 is adapted to tilt or rotate about the shaft 36 and to be locked in adjusted position by means of a clamping device which can be manually operated by a knob 39, the knob 39 being threadedly mounted on one end of a shaft 40 (Figs. 1 and 3) which shaft has its other end fixedly supported in the bifurcation 35, the shaft projecting through a slotted opening 41 in the beam 37 and through an enlarged circular opening in the bifurcation 34 in which a hub 39 on the knob 39 extends. Thus, when the knob 39 is tightened on the shaft 40 the hub portion 39 which extends through the opening in the bifurcation 34 will engage the side of the beam 37 adjacent the slotted opening 41 and will frictionally hold the beam 37 immovable.

Attached to the beam 37 as by screws 42 is a vertically disposed supporting member 43 which carries at its upper end a lens carrying device 44 having appropriate lenses 45 mounted therein, the lenses 45 being of suitable dioptric power and incorporating base-out prisms. A chin rest 46 is mounted in the lower end of the member and is adapted for vertical adjustment as by a conventional threaded shaft and nut arrangement 47. Grooved lens holders 48 are attached to the cylinder 44 adjacent the lenses 45 for insertion of additional lenses if desired.

The principal operating parts of the instrument are carried by the beam 37 which is preferably formed of metal or other nonwarping material. The beam 37 and lens carrying device 44 are disposed so that the beam 37 extends generally along the median line of the device 44.

Figure 2:
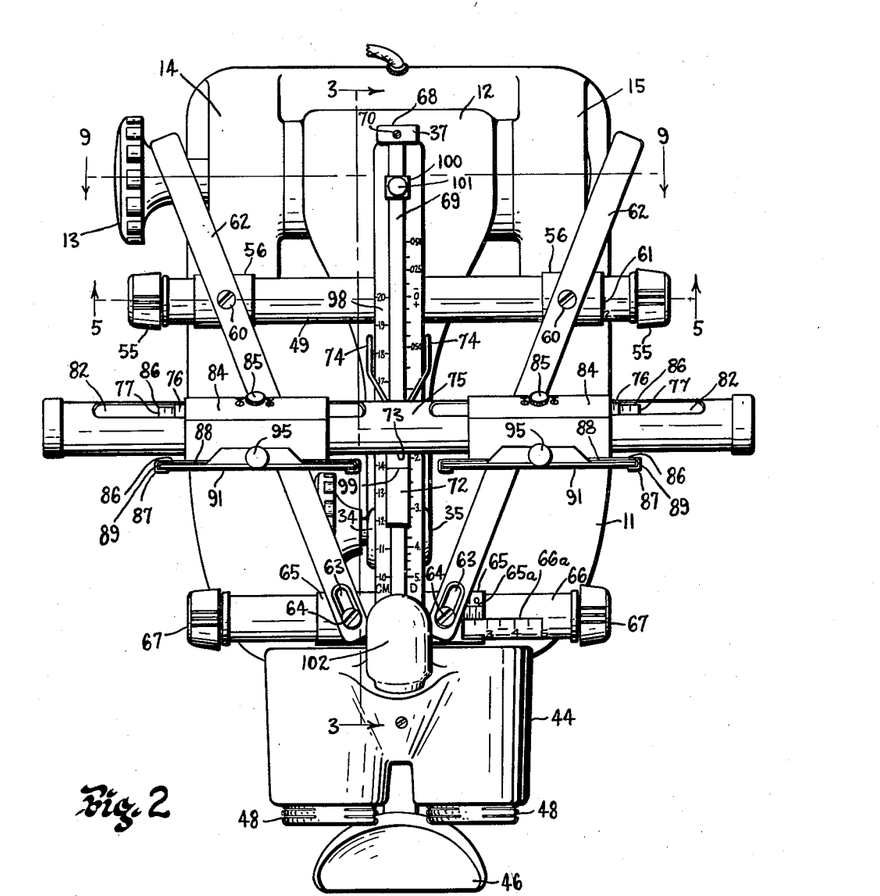
Fig. 2 is a top plan view of the device shown in Fig. 1.
Figure 5:
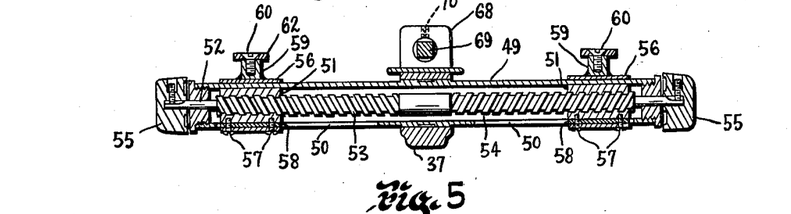
Fig. 5 is a sectional view of an adjustment tube taken on line 5—5 of Fig. 2 and looking in the direction of the arrows.

Adjacent its end farthest away from the supporting member 43 the beam 37 is provided with a transversely extending tube 49 (Figs. 2 and 5) which is immovably secured in the beam 37. The tube 49 is provided with a longitudinal slot 50 in its lower surface on each side of the beam 37 and has a pair of slides 51 mounted for sliding movement therein. A shaft 52 is located within the tube and has oppositely threaded portions 53 and 54 each of which portions carries one of the slides 51. A pair of knobs 55 are secured as by set screws or the like to the ends of the shaft 52 and upon revolving the shaft 52 by manual rotation of either of the knobs 55 the slides 51 can be made to move toward or away from each other.

Short tubular guides 56 are mounted over the tube 49 adjacent each slide 51 and are attached to the slides 51 for movement therewith longitudinally of the tube 49 by screws 57, the screws being inserted through the bottom portions of the guides 56 and slides 51 and through spacers 58 located in the longitudinal slots 50 between the guides and the slides.

Each guide 56 has a boss 59 located on its upper surface to each of which is pivotally secured, as by a screw 60, an angularly extending slide bar 62. Thus, when either of the knobs 55 are rotated to cause the guides 56 to move longitudinally of the tube 49, the bars 62 will consequently be moved accordingly an amount in accordance with the reading of a scale 61 (Fig. 2) which is provided on the upper surface of the tube 49, the edge of one of the guides 56 being adapted to be aligned with the graduations on the scale 61 in positioning the bars 62.

The bars 62 are adapted to extend toward the supporting member 43 and have their ends adjacent the member 44 provided with slotted openings 63, the bars 62 being pivotally supported by studs 64 on guides 65. The guides 65 are movable longitudinally of a sleeve 66 upon manipulation of either of a pair of knobs 67 located adjacent the ends of the sleeve 66 in a manner similar to the guides 57 on the tube 49 and in accordance with the reading of scales 65a and 66a on one of the guides 65 and one end of the sleeve 66 respectively. Thus, upon rotation of one of the knobs 67 a threaded shaft (not shown) and simulating the shaft 52 will be operated to move the guides 65, and consequently the ends of the arms 62 will be movable accordingly.

By operation of the knobs 55 and 67 it can be seen that the spacing between the bars 62 and the beam 37 can be regulated and the angle which the bars 62 make with the beam 37 can be correspondingly changed.

This adjustment provides means for controlling the horizontal adjustment of a pair of stereogram targets or charts which are movable in a direction longitudinally of the beam 37 and adapted to be simultaneously spaced horizontally with respect to one another in accordance with the position of the arms 62.

The beam 37 has an upwardly extending projection 68 on one end thereof in which is formed an aperture which is adapted to receive one end of a rail 69 which is retained therein as by a set screw 70 (Figs. 2, 3 and 5), the rail 69 being spaced above and extending substantially parallel to the beam 37 and having its other end secured by a screw 71 to a boss formed on the beam 37 adjacent the supporting member 43.

The rail 69 slidably carries a slide member 72 having a longitudinal rectangular opening which fits about the rail 69, the slide member 72, therefore, being adapted to slide freely along the rail 69. The slide member 72 supports the stereogram targets and for this purpose there is provided a bracket 73 which is fixedly secured to the upper surface of the slide member 72, with rearwardly extending finger grips 74 being attached to the slide member 72 so that the target supporting device can be easily moved along the rail 69.

Figure 4:
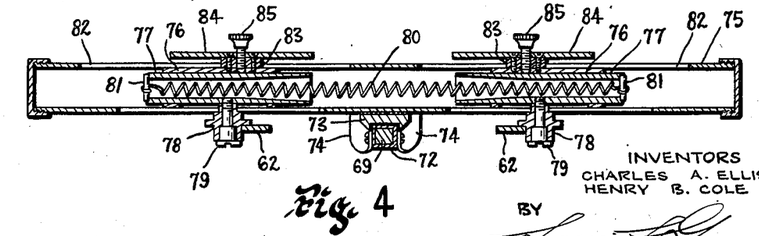
Fig. 4 is a sectional view of the chart supports taken on line 4—4 of Fig. 3 and looking in the direction of the arrows.

A transversely disposed tubular holder 75 is fixedly carried by the bracket 73 and has slidably mounted therein a pair of bushings 76 (Fig. 4) which are slidably located on tubular slides 77. A roller 78 is attached as by a stud 79 to each of the slides 77 and each is adapted to extend through a longitudinal slot in the holder 75 and to engage the outer edge of one of the adjustable bars 62. A coiled tension spring 80 connects each of the slides 77, each end thereof being attached as by a pin 81 to the outer end of one of the slides. The spring 80 tends to urge the slides toward one another and thus maintains the rollers 78 in constant engagement with the bars 62.

Thus, it will be understood that as the slide member 72 and holder 75 is caused to slide forwardly or rearwardly on the rail 69 the angularly disposed bars 62 will, through their engagement by the rollers 78, cause the slides 77 and bushings 76 to move horizontally within the holder 75 in accordance with the angle described by the relation of the bars 62 with the rail 69.

The rear portion of the holder 75 has a pair of spaced longitudinal slotted openings 82 through which project spacers 83 which serve to connect angular target supporting brackets 84 to the slidable bushings 76, the brackets 84 and spacers 83 being suitably connected to the bushings 76 as by screws or rivets.

The target supporting brackets 84 and bushings 76 are individually and independently adjustable longitudinally on the slides 77 and are adapted to be retained in adjusted positions by means of set screws 85. The surface of each of the slides 77 is provided with a scale 86 graduated in millimeters adjacent the openings 82 and the edges of the bushings 76 are adapted to be aligned with the graduations on the scales. This provides means for indicating decentration of the target holders.

The target supporting brackets 84 are each provided with an upwardly extending portion to which are riveted or otherwise fixedly secured vertical supporting plates 86 having their sides bent into substantially U-shaped portions 87 in which are slidably disposed adjustable target holding plates 88 having U-shaped side portions 89 located within the portions 87 of the supporting plates 86 and also having trough-shaped bottom edges 90, the targets or pictures 91 being inserted from the top into the portions 89 and trough 90 and vertically movable with the target holding plates 88.

Adjacent the upper edges of each of the vertical supporting plates 86 are located rearwardly extending lugs 92 having threaded bores concentric with bores in the rearwardly extending shelf 93 formed integral with the upper end of each of the target holding plates 88 (Figs. 6 and 7). The bores are each provided to receive a vertically extending threaded adjusting screw 94. The upper end of each screw 94 is provided with a knurled knob 95 and a fixed washer 96 spaced slightly below the knob 95 to permit the shelf 93 to be received therebetween, the washer 96 being pinned or otherwise immovably secured to the screw 94. Thus, when either of the knobs 95 are rotated the screw 94 is caused to turn and, due to the position of the knob 95 and washer 96, the shelf 93 and target holding plate 88 will be caused to move either upwardly or downwardly, depending on the direction in which the knob is turned. Therefore, the rotation of the knob 95 will cause the picture or target 91 to move in a vertical direction, each target being individually adjustable independently of the other. The amount of such adjustment can be determined in accordance with a scale 97 provided on the rear of each of the target holding plates 88, the scales 97 having centimeter graduations adapted to be aligned with the upper edges of the target supporting plates 86 in positioning the plates 97 as desired.

In order to ascertain at a glance the relative spacing of the targets 91 from the lenses 45, the upper surface of the beam 37 is provided with a longitudinal scale 98 graduated in fractional diopters with the focal plane of the lenses (or infinity) being the zero point on said scale and also in centimeters with the zero point of this latter scale being the plane of the lenses. The slide member 72 has an indication 99 marked thereon which is vertically aligned with the plane of the targets 91 and adapted to indicate the position of the targets on the scale 98. Stops 100 are adjustably located on the rail 69 in order to limit the travel of the target carrying means and are adapted to be retained in adjusted position by means such as set screws 101.

So that the targets 91 may be clearly illuminated there is provided a light source comprising a suitable fixture 102 carrying a lamp 103, illumination from which is reflected by the fixture 102 onto the front surfaces of the targets 91, the lamp 103 being connected to a suitable available source of current through a wire 103a.

In using the present device, the instrument is initially adjusted to comfortably accommodate the patient by elevating or depressing the portions of the instrument above the base. This is done by grasping the stand 12, turning the knob 13 to loosen the friction lock, moving the stand up or down to the desired position, and locking it in this position by tightening the knob 13. This is followed by adjusting the chin rest 46.

In using the instrument to exercise the patient's eyes, the scale 98 is used to indicate the distance at which the targets 91 are positioned away from the plane of the lenses 45. This is calculated from the portion of the scale graduated in centimeters, this portion being graduated to 20 centimeters inclusive, 20 centimeters being the focal plane of the lenses. The portion of the scale 98 calibrated in fractional diopter steps reading from the focal plane of the lenses with zero being positioned on this plane.

With the rear stop 100 set so that the target holding device, in being positioned thereagainst, will position the targets 91 in the focal plane of the lenses, the knobs 55 can be operated to determine the separation of the targets in the focal plane of the lenses, while the control knobs 67 similarly determine their separation in the plane of the lenses.

Figure 11:
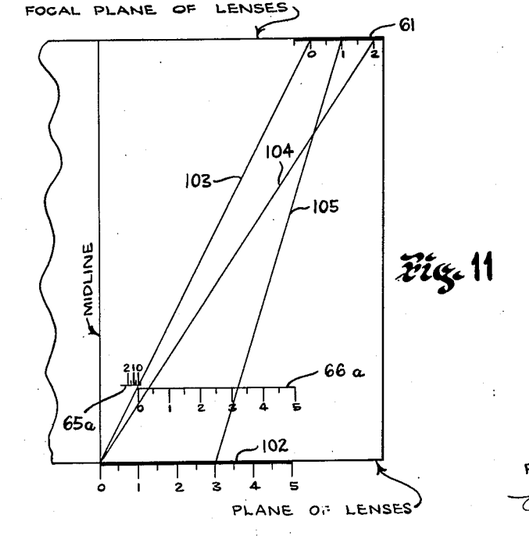
Fig. 11 is a diagrammatic view of the scale means used for setting the device for various tests or exercises and for indicating the same.

The zero settings on the scales 61, 65a and 66a indicate normal or perfect vision, representing the setting for orthoptic viewing with centered targets. Scale 61 is graduated in centimeters and is calibrated to indicate up to 2 cm. from the zero mark in a direction away from the midline and to ½ cm. nearer the midline (Fig. 11). Scale 66a is provided with graduations representing displacements outwardly from the midline in amounts up to 5 units from the zero setting.

Because of the displacement of this scale 66a from the plane of the lenses, in which plane these readings have the indicating meaning, the exact settings will vary somewhat, depending on the setting on the scale 61 in the focal plane of the lenses. This is compensated for by the scale 65a which represent a reverse arrangement of the markings on scale 61. The mark which represents the reading on scale 61 is to be considered the indicator to be used in making the setting on scale 66a. For example, Fig. 11, which diagrammatically illustrates the use of these scales, shows that if the instrument is to be set for orthoptic or normal viewing, wherein the demands on convergence and accommodation will retain their normal relation, the setting on scale 61 will be zero. Then the zero graduation on scale 65a will become the indicator to be set at zero on the scale 66a. Scale 102 in Fig. 11 is an imaginary scale positioned on the plane of the lenses and by setting the scales 61, 65a and 66a as described it will be understood that this will direct the path of the target indicated by numeral 103 toward zero on the imaginary scale 102, which is the condition for orthoptic viewing. It is also to be understood that Fig. 11 illustrates the method of defining the adjustment of the path for only one of the targets and that the other target while not shown has a corresponding path.

If a path deviating from the orthoptic path is desired, as for example when an exophoria at distance makes fusion at the zero point difficult, the scale 61 may be set as at 2, for instance. Then 2 on the scale 65a will be used as the indicator on the scale 66a. If it is desired to converge to the zero position in the plane of the lenses, for instance, the indicator 2 on scale 65a will be set at zero on scale 66a. This will result in the targets traveling in a path as indicated by 104 when the said targets are moved toward or away from the patient.

As a further example, it may be desired to set scale 61 at 1 and converge to 3 in the plane of the lenses, in which case scale 61 will be set at 1 and the indicator 1 on scale 65a will be set at 3 on scale 66a. This will result in path 105.

An instrument constructed according to the foregoing has many possibilities for stereo measurement and training. It has the advantage of placing the targets in any suitable position and permitting the patient to develop his fusion.

It is to be understood that without instrumentation demands upon accommodation and convergence are normally correlated, and these requirements can be duplicated with the presently disclosed instrument when the targets follow the paths of orthoptic viewing, that is when the scales are set at zero and the target holders are adjusted to compensate for any decentering of the targets. Such conditions are desirable, for example, when it is desired to test the patient's response to diagnostic targets under normal conditions of viewing or when it is desirable to stimulate accommodation and convergence in their normal association as, for example, at the conclusion of a visual training program designed to facilitate response of a lagging function or to discourage a tendency to excessive response.

However, in exercises for convergence weakness or where positive relative convergence is low, the practitioner or patient may elect to set the movable guide bars so that conditions for orthoptic viewing are established with distance fixation in the focal plane of the lenses, while the demand upon convergence is in excess of the normal amount associated with accommodation for any nearer distance. In exercising the eyes with adjustments made accordingly, such stimulative exercises are directed in a greater ratio toward the convergence than to the accommodative function. In the case of divergence weakness, a pattern can be set up so that the demand for relative divergence is gradually increased until the patient establishes an adequate pattern of association between divergence and relaxation of accommodation. Similarly, patterns may be set up that require inhibition of convergence or of divergence with changes in the stimulus to accommodation.

From the foregoing it is evident that the presently described device is an improvement upon prior art devices of this character by providing simple and efficient means for accomplishing all of the objects of the invention whereby the device can be more universally adjusted and has increased efficiency in aiding in the correction of certain visual defects with means being provided to more easily and quickly set the instrument with greater exactness than has heretofore been possible so that the patient's eyes can be more efficiently examined and exercised in accordance with the desires of the practitioner.

While the novel features of the invention have been shown and described and are pointed out in the annexed claims, it will be understood that various omissions, substitutions and changes in the formation and details of the device illustrated, and in its operation, may be made by those skilled in the art without departing from the spirit of the invention as expressed in the accompanying claims. Therefore, it is to be understood that all matter set forth or shown is to be interpreted as illustrative and not in a limiting sense.

We claim:

1. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, and means on the support coacting with said target holding device and said targets for changing the spacing between the targets as the holding device is moved, said means comprising a pair of slide members mounted on the target holding device for movement normal to the direction of movement of the target holding device, resilient means urging said slide members toward each other, a guideway on said support adjacent each target having a pair of angularly disposed plane surfaces extending longitudinally thereof, and a roller carried by each of said slide members having a seat for engaging about said surfaces of a respective guideway under the action of said resilient means for simultaneously moving the targets toward or away from each other as they are moved respectively toward or away from the lens carrying device so as to cause the targets to follow paths disposed at angles in accordance with the angles at which the guideways extend with respect to said support.

2. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, means on the support coacting with said target holding device and said targets for changing the spacing between the targets as the holding device is moved, said means comprising a guideway on said support adjacent each target, and a follower associated with each target and cooperating with the adjacent guideway for simultaneously moving the targets toward or away from each other as they are moved respectively toward or away from the lens carrying device at angles in accordance with the angles at which the guideways extend with respect to said support and adjustment means for initially adjusting the angles at which said guideways extend with respect to said support, said adjustment means being provided at each end of said guideway to alter the separation of the adjacent ends of said guideways whereby the angle of convergence or divergence of the paths of the targets as they are moved longitudinally of the support may be controlled.

3. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, means on the support coacting with said target holding device and said targets for changing the spacing between the targets as the holding device is moved, said means comprising a guideway on said support adjacent each target, and a follower associated with each target and cooperating with the adjacent guideway for simultaneously moving the targets toward or away from each other as they are moved respectively toward or away from the lens carrying device at angles in accordance with the angles at which the guideways extend with respect to said support and adjustment means for initially adjusting the angles at which said guideways extend with respect to said support, said adjustment means being provided at each end of said guideways to control the angle of convergence or divergence of the paths of the targets as they are moved longitudinally of the support, said adjustment means comprising tubular members spanning the ends of said guideways, each tubular member carrying a rotatable rod therein, said rods having oppositely threaded portions, and the guides connecting said guideways to said threaded portions so that upon rotation of either of said rods the respective ends of the guideways will be moved with respect to one another to change the angle which the guideways make with said support.

4. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, means on the support coacting with said target holding device and said targets for changing the spacing between the targets as the holding device is moved, said means comprising a guideway on said support adjacent each target, and a follower associated with each target and cooperating with the adjacent guideway for simultaneously moving the targets toward or away from each other as they are moved respectively toward or away from the lens carrying device at angles in accordance with the angles at which the guideways extend with respect to said support and adjustment means for initially adjusting the angles at which said guideways extend with respect to said support, said adjustment means being provided at each end of said guideways to control the angle of convergence or divergence of the paths of the targets as they are moved longitudinally of the support and indicating means associated with each of said adjustment means for indicating the amount of movement of the guideways.

5. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, angled guideways on the support coacting with said target holding device and said targets for changing the spacing between the targets as the holding device is moved, adjustment means for initially adjusting the spacing of each end of the guideways with respect to the corresponding end of the other guideway whereby the angles at which said guideways extend with respect to said support may be controlled, and indicating means associated with said adjustment means for indicating the amount of movement of the guideways, said indicating means comprising graduated scales defining the spacing of the targets when in the plane of the lenses and when in the focal plane of the lenses.

6. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, guideways on the support coacting with said target holding device and said targets for changing the spacing between the targets as the holding device is moved, adjustment means for initially adjusting the angles at which said guideways extend with respect to said support, said adjustment means comprising tubular members spanning the ends of said guideways, each tubular member carrying a rotatable rod therein, said rods having oppositely threaded portions, and guides connecting said guideways to said threaded portion so that upon rotation of either of said rods the guideways will be moved with respect to one another to change the angle which the guideways make with said support, and indicating means associated with each of said tubular members for indicating the amount of movement of the guideways, said indicating means comprising graduated scales provided on said tubular members, adjacent the guides connected to the guideways, said guides being aligned with the scale graduations in adjusting the guideways at desired angles, the scale on the tubular member adjacent the lens carrying device defining the spacing of the targets when in the plane of the lenses, and the scale on the other tubular member defining the spacing of the targets when in the focal plane of the lenses.

7. A device of the character described comprising a longitudinal support on which is slidably mounted a target holding device movable longitudinally thereof and carrying a pair of spaced targets representing the stereoscopic complement of each other, a lens carrying device mounted on said support for viewing said targets, means on the support coacting with said target holding device and said targets for changing the spacing between the targets as the holding device is moved, said means comprising a guideway on said support adjacent each target, and a follower associated with each target and cooperating with the adjacent guideway for simultaneously moving the targets toward or away from each other as they are moved respectively toward or away from the lens carrying device at angles in accordance with the angles at which the guideways extend with respect to said support and adjustment means for initially adjusting the angles at which said guideways extend with respect to said support, said adjustment means being provided at each end of said guideways to control the angle of convergence or divergence of the targets as they are moved longitudinally of the support, said adjustment means comprising tubular members spanning the ends of said guideways, each tubular member carrying a rotatable rod therein, said rods having oppositely threaded portions, and guides connecting said guideways to said threaded portions so that upon rotation of either of said rods the guideways will be moved with respect to one another to change the angle which the guideways make with said support, and indicating means associated with each of said tubular members for indicating the amount of movement of the guideways, said indicating means comprising graduated scales provided on said tubular members adjacent the guides connected to the guideways, said guides being aligned with the scale graduations in adjusting the guideways at desired angles, the scale on the tubular member adjacent the lens carrying device defining the spacing of the targets when in the plane of the lenses, and the scale on the other tubular member defining the spacing of the targets when in the focal plane of the lenses.

8. In a device of the character described, the combination of a base and a support carrying a target holder and sighting means for use in viewing target means held by said holder, said base having a pair of spaced uprights formed thereon, and the support having an end portion disposed therebetween for pivotal connection therewith, said uprights and said end portion having concentric openings formed therein, a friction clamp member disposed within the opening in said end portion and having one end engaged by a bushing fixedly supported in the opening in one of said uprights and having its other end engaged by a second bushing slidably supported in the opening in the other upright, said bushings and clamp member having concentric openings therein, a shaft fixedly mounted in said last named concentric openings, said shaft having a head portion engaging the outer end surface of said fixed bushing, and a clamp knob mounted on the other end of said shaft and adapted to bear upon the outer end of said slidable bushing, whereby upon tightening the knob pressure will be exerted upon said clamp member to cause said clamp member to render said support immovable.

9. In a device of the character described, the combination of a base and a support carrying a target holder and sighting means for use in viewing target means held by said holder, said base having a pair of spaced uprights formed thereon, and said support having an end portion disposed therebetween for pivotal connection therewith, said uprights and said end portion having concentric openings formed therein, the opening in the end portion communicating with said base, a tubular friction clamp member disposed within the opening in said end portion, said clamp member having a longitudinal split with the end portions of the member adjacent the ends of the split being provided with V-shaped notches, a bushing fixedly supported in the opening in one of said uprights and engaging one end of said clamp member, a second bushing slidably disposed within the opening in the other upright and engaging the other end of said clamp member, said bushings having concentric openings therein and having extensions formed on the ends thereof engaging the clamp member, said extensions being of a size and shape to engage the notches in said member, a shaft fixedly mounted in said last named concentric openings and extending through said clamp member, said shaft having a head portion engaging the outer end surface of said fixed bushing, and a clamp knob mounted on the other end of said shaft to bear upon the outer end of said slidable bushing, whereby upon tightening the knob pressure will be exerted upon said bushings and clamp member to cause said extensions to be forced inwardly of the notches in the clamp member to widen the split and cause said clamp member to forcefully engage the support end portion and base to render said support immovable.

10. In a device of the character described, the combination of a base and a support carrying a target holder and sighting means for use in viewing target means held by said holder, a pair of spaced uprights formed on said base with an end portion of said support disposed therebetween for pivotal connection therewith, said uprights and said end portions having concentric openings formed therein, the opening in the end portion communicating with said base, a tubular friction clamp member disposed within the opening in said end portion, said clamp member having a longitudinal split with the end portions of the member adjacent the ends of the split being provided with V-shaped notches, and further having notches formed therein in diametrical opposition to said first notch, a bushing fixedly supported in the opening in one of said uprights and engaging one end of said clamp member, a second bushing slidably disposed within the opening in the other upright and engaging the other end of said clamp member, said bushings having concentric openings therein and having V-shaped extensions formed on the ends thereof engaging the clamp member, said extension being of a size and shape to engage the notches in said member and further having extensions diametrically opposed to said first extensions, said last named extensions being of a size and shape to comate with the adjacent notches in the clamp member, the slidable bushing having means associated therewith to prevent rotation thereof while permitting sliding movement within the opening, a shaft fixedly mounted in said last named concentric openings and extending through said clamp member, said shaft having a head portion engaging the outer end surface of said fixed bushing, and a clamp knob mounted on the other end of said shaft to bear upon the outer end of said slidable bushing, whereby upon tightening the knob pressure will be exerted upon said bushings and clamp member to cause the extensions on the bushings diametrically opposed to said V-shaped extensions to enter the comating notches in the clamp member to prevent rotation of said clamp member and simultaneously cause said extensions to be forced inwardly of the notches in the clamp member to widen the split and cause said clamp member to forcefully engage the support end portion and base to render said support immovable.

11. A device of the character described comprising a pair of longitudinal guide members disposed in laterally spaced relation, sighting means adjacent one end of said guide members, a support slidable longitudinally of said guide members, a pair of target holders each adapted to carry a target, said target holders being mounted on the support for movement toward and away from each other, a follower carried by each of said target holders and mounted with a respective guide member for longitudinal movement therealong, and adjustment means for altering the extent of separation between the opposed ends of said guide member with respect to the corresponding ends of the other guide member, whereby the angular relation of and the spacing between said corresponding ends of the guide members may be adjusted to desired relations to control the paths of movement of the targets in operation of the device.

CHARLES A. ELLIS.
HENRY B. COLE.

REFERENCES CITED

The following references are of record in the file of this patent:

UNITED STATES PATENTS

| Number | Name | Date |
|---|---|---|
| 1,895,746 | Bates | Jan. 31, 1933 |
| 2,091,173 | Wottring | Aug. 24, 1937 |
| 2,362,857 | Renshaw | Nov. 14, 1944 |
| 2,414,649 | Kelly | Jan. 21, 1947 |
| 2,422,384 | Alexander | June 17, 1947 |
| 2,473,651 | Katz | June 21, 1949 |